US009246911B2

(12) United States Patent
Kano (10) Patent No.: US 9,246,911 B2
(45) Date of Patent: Jan. 26, 2016

(54) AUTHENTICATION APPARATUS, AUTHENTICATION SYSTEM, AUTHENTICATION METHOD, AND RECORDING MEDIUM HAVING AUTHENTICATION PROGRAM RECORDED THEREON

(75) Inventor: Takahiro Kano, Toyonaka (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 1070 days.

(21) Appl. No.: 12/495,855

(22) Filed: Jul. 1, 2009

(65) Prior Publication Data
US 2010/0031346 A1 Feb. 4, 2010

(30) Foreign Application Priority Data
Jul. 29, 2008 (JP) ................................ 2008-194832

(51) Int. Cl.
G06F 21/00 (2013.01)
H04L 29/06 (2006.01)
G06F 21/31 (2013.01)
G06F 21/41 (2013.01)
G06F 21/60 (2013.01)

(52) U.S. Cl.
CPC ............ H04L 63/083 (2013.01); G06F 21/316 (2013.01); G06F 21/41 (2013.01); G06F 21/608 (2013.01); G06F 2221/2101 (2013.01); G06F 2221/2117 (2013.01); G06F 2221/2137 (2013.01)

(58) Field of Classification Search
USPC ......................................................... 726/19
See application file for complete search history.

(56) References Cited

U.S. PATENT DOCUMENTS

| 5,781,725 | A | 7/1998 | Saito |
| 6,026,258 | A * | 2/2000 | Fresk et al. ..................... 399/87 |
| 6,360,326 | B1 * | 3/2002 | Hiles ............................... 726/19 |
| 6,785,727 | B1 * | 8/2004 | Yamazaki ..................... 709/229 |
| 7,024,556 | B1 * | 4/2006 | Hadjinikitas et al. ......... 713/168 |

(Continued)

FOREIGN PATENT DOCUMENTS

| JP | 08-314863 | 11/1996 |
| JP | 2005-063146 | 3/2005 |

(Continued)

OTHER PUBLICATIONS

Notice of Grounds of Rejection issued in the corresponding Japanese Patent Application No. 2008-194832 dated May 11, 2010, and an English Translation thereof.

Primary Examiner — Vikkram Bali
Assistant Examiner — Tracy Mangialaschi
(74) Attorney, Agent, or Firm — Buchanan Ingersoll & Rooney PC (57) ABSTRACT

It is determined whether a login button is pressed or not. If the login button being pressed is sensed, a user authentication window appears. After the user authentication window appears, it is determined whether an authentication code is input or not. If an authentication code is input, then it is determined whether a prescribed period of time has passed or not since the last logout. If it is determined that a prescribed period of time has not passed since the last logout, authentication is performed in MFP. It is then determined whether the authentication is "OK" or not. If the authentication is "OK," the authentication is successful. A login process is then executed.

13 Claims, 6 Drawing Sheets

(56) References Cited

U.S. PATENT DOCUMENTS

| | | | |
|---|---|---|---|
| 7,025,260 B1* | 4/2006 | Stevens et al. | 235/382 |
| 7,506,054 B1* | 3/2009 | Fuh et al. | 709/225 |
| 2003/0093690 A1* | 5/2003 | Kemper | 713/201 |
| 2003/0145219 A1* | 7/2003 | Cossel et al. | 713/200 |
| 2004/0006710 A1* | 1/2004 | Pollutro et al. | 713/201 |
| 2004/0103323 A1* | 5/2004 | Dominic | 713/202 |
| 2004/0114175 A1* | 6/2004 | Cherry et al. | 358/1.15 |
| 2005/0091338 A1* | 4/2005 | de la Huerga | 709/217 |
| 2006/0015725 A1* | 1/2006 | Voice et al. | 713/168 |
| 2006/0064753 A1* | 3/2006 | Otake et al. | 726/19 |
| 2006/0082816 A1* | 4/2006 | Daniel et al. | 358/1.15 |
| 2006/0136992 A1* | 6/2006 | Shigeeda | 726/2 |
| 2006/0195802 A1* | 8/2006 | Nakayama | 715/867 |
| 2006/0224733 A1* | 10/2006 | Ueda | 709/224 |
| 2006/0225129 A1* | 10/2006 | Inoue | 726/3 |
| 2007/0028100 A1 | 2/2007 | Sato | |
| 2007/0067627 A1* | 3/2007 | Dokuni | 713/168 |
| 2007/0192843 A1* | 8/2007 | Peterson et al. | 726/10 |

FOREIGN PATENT DOCUMENTS

| | | |
|---|---|---|
| JP | 2005-142848 | 6/2005 |
| JP | 2006-092018 A | 4/2006 |
| JP | 2006-110863 A | 4/2006 |
| JP | 2006110863 A * | 4/2006 |
| JP | 2006-178836 | 7/2006 |
| JP | 2007-036701 A | 2/2007 |

* cited by examiner

AUTHENTICATION APPARATUS, AUTHENTICATION SYSTEM, AUTHENTICATION METHOD, AND RECORDING MEDIUM HAVING AUTHENTICATION PROGRAM RECORDED THEREON

This application is based on Japanese Patent Application No. 2008-194832 filed with the Japan Patent Office on Jul. 29, 2008, the entire content of which is hereby incorporated by reference.

BACKGROUND OF THE INVENTION

1. Field of the Invention

The present invention relates to an authentication apparatus including authentication means for executing a user authentication process when the apparatus is to be used.

2. Description of the Related Art

Conventionally, a user authentication process is generally performed in terms of security, for example, in information processing apparatuses such as printers or MFP (Multi Function Peripheral).

Specifically, in the user authentication process, it is known that a user is recognized by entering a user ID and a password from an operation panel, and whether the user is permitted or not permitted to use the apparatus is determined.

Because of this user authentication process, the use of the apparatus is not allowed as long as the user ID and the password that are registered in advance are not entered. The user authentication process is therefore effective in particular when the apparatus control is performed or when security is intended to be enhanced.

In such information processing apparatuses, when a user inputs the correct user ID and password in a not-permitted (prohibited) state in which the apparatus use is not permitted, the apparatus is switched to a permitted state (login state) in which the apparatus use is permitted. The user is thus allowed to make a copy, for example. Once the user has finished the processing such as copying, the user sets the not-permitted state (logout state) in which the apparatus use is not permitted.

The information processing apparatus having the function of the user authentication process described above is sometimes inconvenient for the user. Specifically, even when the user becomes aware that one copy is missing after completion of copying and wants to make one more copy, if the logout state is set at that moment, the user has to enter the user ID and the password as the first procedure to switch the apparatus to the login state, even immediately after completion of copying. It requires time and effort.

In order to address this, Japanese Laid-Open Patent Publication No. 2006-110863 discloses that when the apparatus is shifted to the logout state and thereafter shifted to the login state again in a prescribed period of time, the user authentication process is executed only with a password which requires less inputs.

In the user authentication process in the publication above, however, a user ID and a password are registered in the apparatus in advance. Therefore, in the environment in which a plurality of information processing apparatuses are used, similar information has to be input and registered, which operation is very complicated and cumbersome.

Moreover, it is not preferable in terms of security that user information is stored in each apparatus. In response, Japanese Laid-Open Patent Publication No. 2006-092018 discloses that user information is stored in an authentication server connected via a network in order to execute the user authentication process. Japanese Laid-Open Patent Publication No. 2007-036701 discloses that user information is stored in an original, particular information processing apparatus connected via a network and is then used to execute the user authentication process.

In the above-mentioned technique of executing the user authentication process by storing user information in an authentication server or in a particular information processing apparatus, the user needs to access the authentication server via the network. For example, when the user becomes aware that one copy is missing after completion of copying and wants to make one more copy, if the logout state is set at that moment, the user has to input the user ID and the password as the first procedure to access the authentication server for execution of the user authentication process, even immediately after completion of copying, as described above. In recent years, the technique of accessing the authentication server, etc. for the user authentication process becomes complicated, in particular, in terms of security, so that it may take more time to shift to the login state.

SUMMARY OF THE INVENTION

The present invention is made to solve the aforementioned problem. An object of the present invention is to provide an authentication apparatus, an authentication method, an authentication system, an authentication program, and a recording medium, which allow a convenient user authentication process to be executed, in consideration of security.

An authentication apparatus in accordance with the present invention includes: an input device for accepting an input of an authentication code; a controller for executing a user authentication process with an authentication server connected via a network, based on comparison between an authentication code input from the input device and an authentication code in the authentication server, to set a user authenticated state; and a memory for storing the input authentication code. The controller determines whether an authentication code was input from the input device during a prescribed period of time after termination of the user authenticated state is designated. The controller sets, if an authentication code was input from the input device during a prescribed period, the user authenticated state, based on comparison with the authentication code stored in the memory.

An authentication system in accordance with the present invention includes: an information processing apparatus for executing a prescribed function; and an authentication server connected to the information processing apparatus via a network for use to execute a user authentication process for using the information processing apparatus. The authentication server includes a first memory for storing an authentication code registered beforehand for executing the user authentication process. The information processing apparatus includes an input device for accepting an input of an authentication code, a controller for executing a user authentication process with the authentication server, based on comparison between an authentication code input from the input device and an authentication code in the first memory of the authentication server, to set a user authenticated state, and a second memory for storing the input authentication code. The controller determines whether an authentication code was input from the input device during a prescribed period of time after termination of the user authenticated state is designated. The controller sets, if an authentication code was input from the input device during a prescribed period, the user authenticated state based on comparison with the authentication code stored in the second memory.

An authentication method in accordance with the present invention includes the steps of: accepting an input of an authentication code; executing a user authentication process with an authentication server, based on comparison between the input authentication code and an authentication code in the authentication server; setting a user authenticated state, based on a result of the user authentication process; storing the input authentication code; designating termination of the user authenticated state; determining whether an authentication code was input during a prescribed period of time after termination of the user authenticated state is designated; if an authentication code was input during a prescribed period of time after termination of the user authenticated state is designated, comparing the stored authentication code with the input authentication code; and setting the user authenticated state, based on the comparing step.

A recording medium in accordance with the present invention has an authentication program recorded thereon for causing a computer to execute processing including the steps of: accepting an input of an authentication code; executing a user authentication process with an authentication server, based on comparison between the input authentication code and an authentication code in the authentication server; setting a user authenticated state, based on a result of the user authentication process; storing the input authentication code; designating termination of the user authenticated state; determining whether an authentication code was input during a prescribed period of time after termination of the user authenticated state is designated; if an authentication code was input during a prescribed period of time after termination of the user authenticated state is designated, comparing the stored authentication code with the input authentication code; and setting the user authenticated state, based on the comparing step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, the embodiments of the present invention will be described with reference to the figures. In the following description, the same parts and components are denoted with the same reference numerals. They have the same designations and functions.

First Embodiment

Using FIG. 1, an authentication system in accordance with a first embodiment of the present invention will be described.

Figure 1:
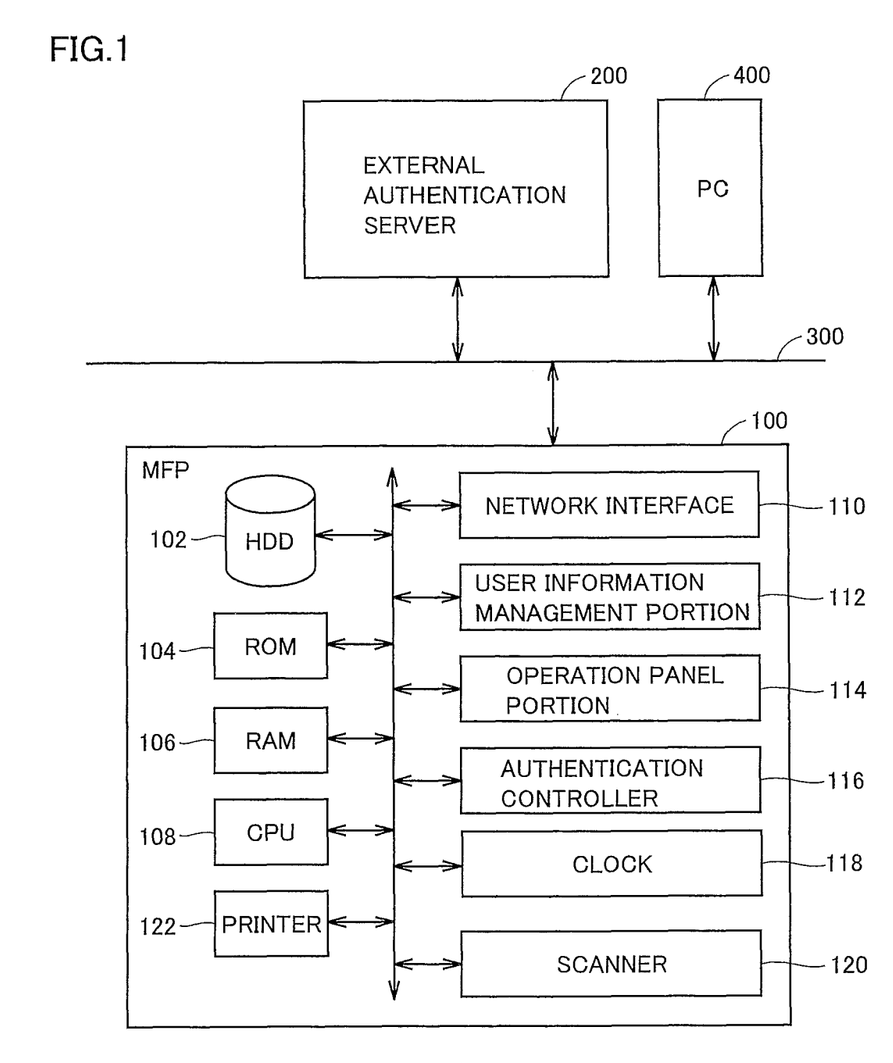
FIG. 1 is a schematic diagram illustrating an authentication system in accordance with a first embodiment of the present invention.

Referring to FIG. 1, the authentication system in accordance with the first embodiment of the present invention includes an MFP (Multi Function Peripheral) 100 which is a kind of authentication apparatus having a function of a user authentication process, an external authentication server 200, and a client PC 400.

MFP 100 and external authentication server 200 are connected via a network 300 so that they can communication with each other. Client PC 400 is a terminal apparatus used by a user and can access MFP 100 via network 300.

Network 300 includes Ethernet, a token-ring, a LAN (Local Area Network) having computers and network equipment mutually connected by a standard such as FDDI (Fiber Distributed Data Interface), a WAN (Wide Area Network) connecting LANs through a dedicated line, the Internet, and the like. It is noted the kind and number of devices connected to network 300 is not limited thereto.

External authentication server 200 is a server computer connected through network 300 to execute a user authentication process as described later. User information and the like including an authentication code (user ID and password) of the user who operates MFP 100 is stored in advance. Specific methods of the user authentication process via network include, for example, digest authentication, challenge response authentication, and any other known methods.

MFP 100 in accordance with the first embodiment of the present invention includes a scanner 120 executing a scan operation for converting materials on paper medium and the like into electronic data, a ROM (Read Only Memory) 104 forming a storage portion, a RAM (Random Access Memory) 106, an HDD (Hard Disk Drive) 102, a printer 122 executing a print process such as a copy operation, a network interface 110 for executing data communications with an external terminal apparatus connected via the network, an operation panel portion 114 provided with a touch panel, a ten-key pad, and the like, an authentication controller 116 executing a user authentication process, a CPU (Central Processing Unit) 108 controlling the entire MFP 100, a user information management portion 112 managing user information, and a clock 118 for obtaining time information. It is noted that each portion is connected with CPU 108 through an internal bus for data communications through the internal bus.

CPU 108 executes the control on each of the aforementioned portions, a variety of operation processing, etc. according to the program stored in ROM 104.

Using FIG. 2, a configuration of an operation panel 10 in MFP 100 in accordance with the embodiment of the present invention will be described.

It is noted that operation panel 10 is included in operation panel portion 114 in FIG. 1.

Figure 2:
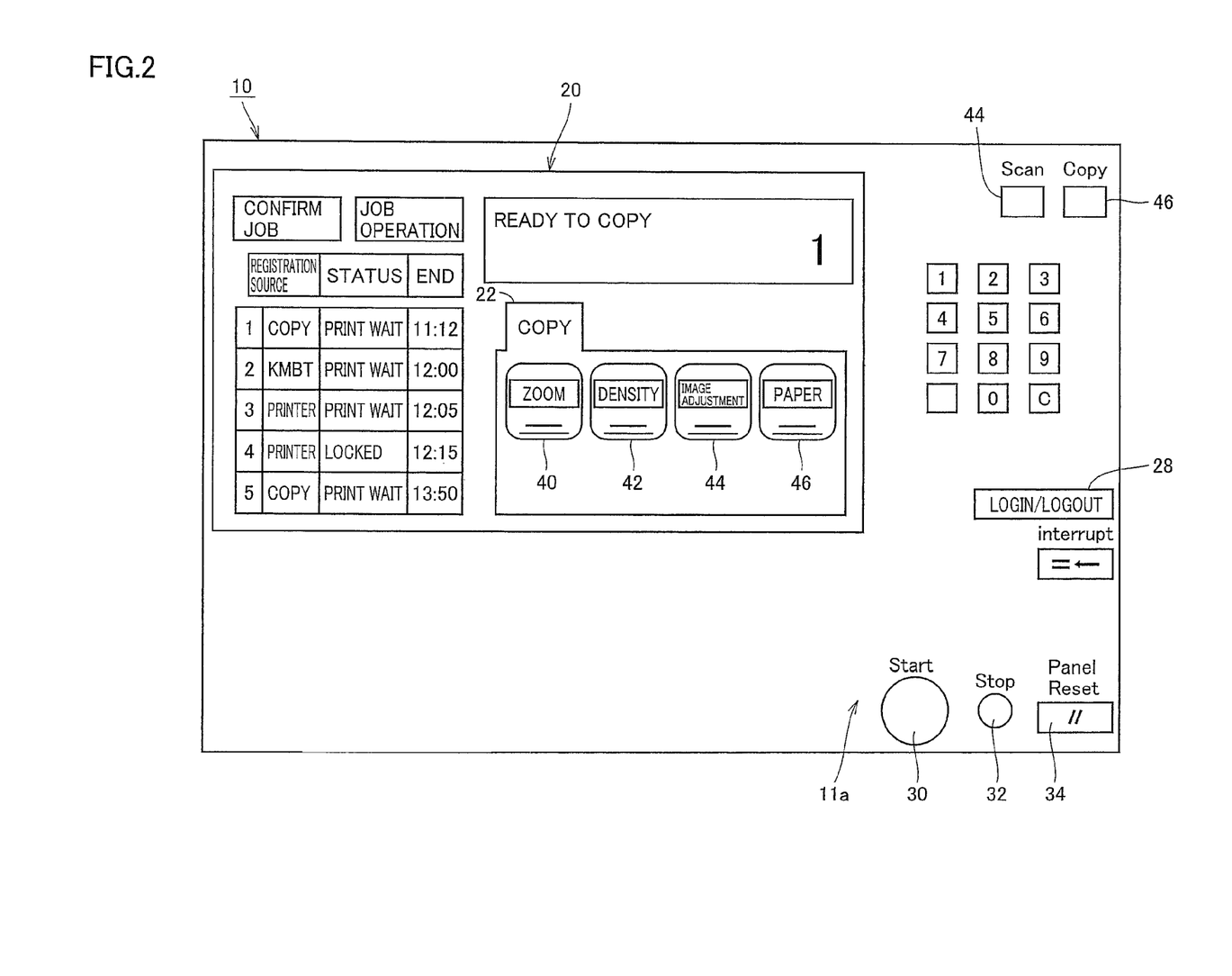
FIG. 2 is an illustration of a configuration of an operation panel in MFP in accordance with the embodiment of the present invention.

Referring to FIG. 2, a Start key 30 is used to start operations such as copy/scan. A ten-key pad is used to input numeric values and the like such as the number of copies. A Clear key is used to clear the input numeric values and discard the accumulated stored image data.

A Stop key 32 is used to give an instruction to stop the copy/scan operation. A Panel Reset key 34 is used to discard the set mode and job.

In addition, an operation display 20 is provided with a touch panel for executing display and setting of a variety of modes.

This touch panel allows the user to make a variety of settings in accordance with the display contents in operation display 20.

Furthermore, in a setting window region using the touch panel, buttons are usually arranged for basic/advanced settings performed in executing a copy operation or a scan operation. When each button is pressed, a layered window appears for performing the detailed settings.

In this example, a detail setting region 22 for executing a copy operation is shown, and an icon for adjusting magnifications, an icon for adjusting density, an icon for image adjustment, and an icon for setting paper are shown in this region, by way of example.

Although the icons for setting details in the case of a copy operation are illustrated in this example, a similar detail setting region is also displayed for a scan operation.

Furthermore, job information applied to MFP 100 at that moment is displayed in the job information window region on the left. The display is arranged in the order of jobs to be executed. When an operation such as deletion/change is performed on a particular job, the job operation button is selected and the job number button for the operation target is thereafter pressed. These operations allow a job operation window to appear, enabling an operation on the particular job.

A Copy key 46 and a Scan key 44 are select keys for setting in which of the copy mode and the scanner mode MFP 100 is to be operated.

When Copy key 46 is pressed, MFP 100 becomes available as a copier. In this state, a scanner operation cannot be executed.

On the other hand, when Scan key 44 is pressed, MFP 100 serves as a scanner. In this state, a copy operation cannot be performed.

It is noted that Copy key 46 and Scan key 44 cause exclusive operations. When one of them is selected, the other is automatically brought into a non-selected state.

Operation panel 10 is further provided with a login/logout button 28. By pressing login/logout button 28 when MFP 100 is to be operated, a login window as described later appears, for example. The user authentication process can be executed by entering the registered user ID or the like. Login/logout button 28 functions as a logout button when login/logout button 28 is pressed in the login state (user authenticated state). Login/logout button 28 functions as a login button when login/logout button 28 is pressed in the logout state.

Using FIG. 3, a user authentication process in accordance with the first embodiment of the present invention will be described.

Figure 3:
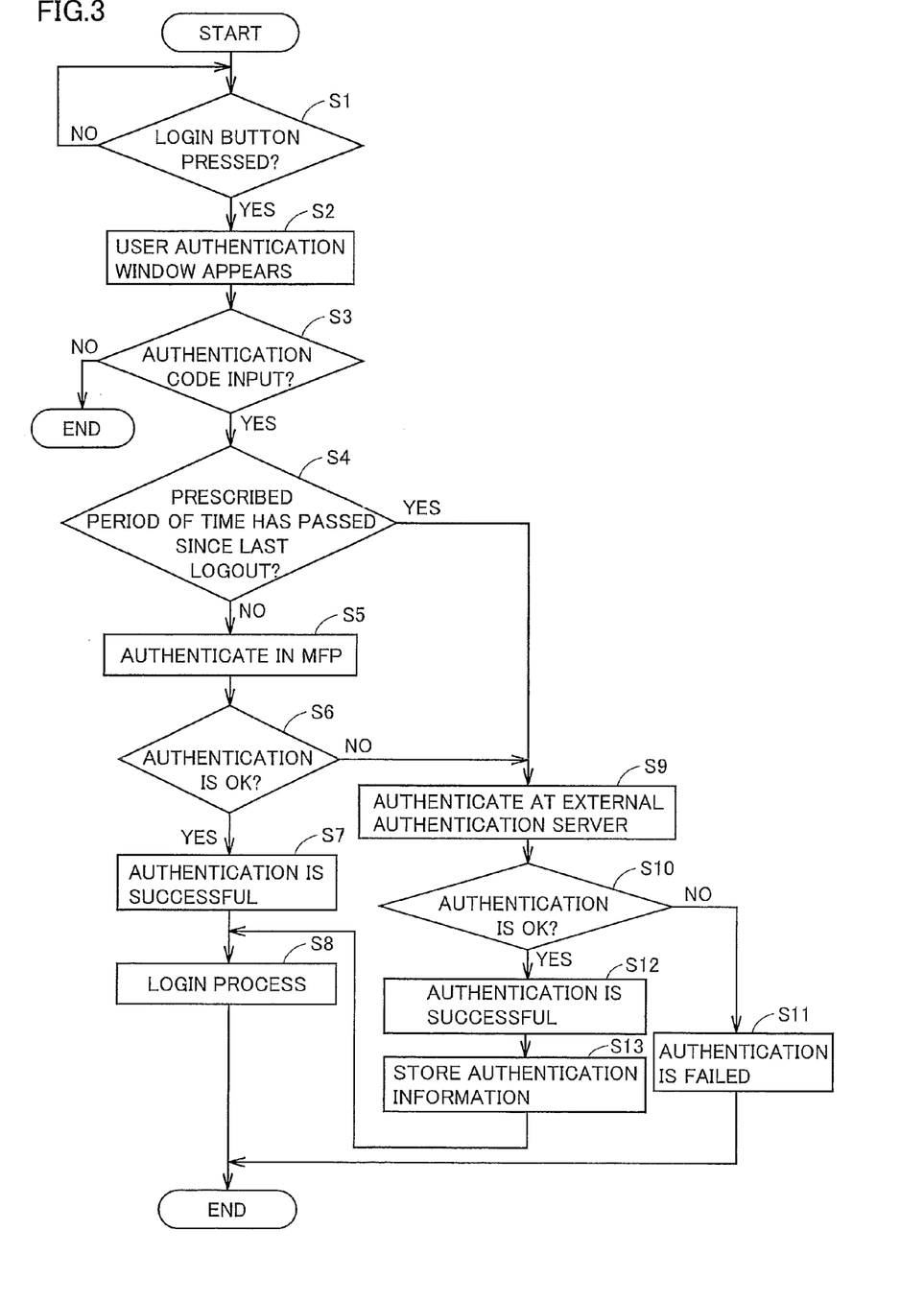
FIG. 3 is a flowchart illustrating a user authentication process in accordance with the first embodiment of the present invention.

Referring to FIG. 3, first, it is determined whether the login button is pressed or not (step S1). Specifically, it is determined whether login/logout button 28 of operation panel 10 is pressed or not. CPU 108 senses that login/logout button 28 of operation panel 10 is pressed.

If CPU 108 senses that login/logout button 28 is pressed in step S1, a user authentication window appears (step S2).

Using FIG. 4, a user authentication window 700 will be described.

Figure 4:
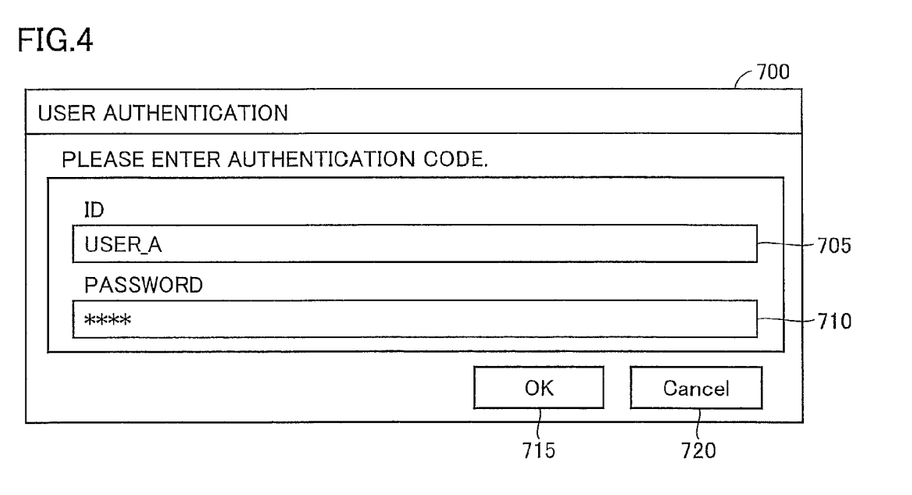
FIG. 4 is an illustration of a user authentication window.

Referring to FIG. 4, in user authentication window 700 in accordance with the first embodiment of the present invention, a window for entering an authentication code when the user authentication process is executed is shown.

Specifically, entry fields 705 and 710 are provided for entering a user ID and a password, respectively, as authentication codes.

The user can enter the user ID and the password using the ten-key pad or the like.

In this example, "USER_A" is input as a user ID and "1234" is input as a password, by way of example. Symbols "*" are displayed as characters to be displayed in entry field 710 for passwords for enhancing the confidentiality.

Referring to FIG. 3 again, after user authentication window 700 appears, it is determined whether the authentication code is input or not (step S3). Specifically, it is determined whether a user ID and a password are entered in entry fields 705 and 710, respectively, and an "OK" button 715 is pressed or not in user authentication window 700.

On the other hand, if a "Cancel" button 720 is pressed in user authentication window 700, the user authentication process ends (END).

If the authentication code is entered in step S3, then it is determined whether a prescribed period of time has passed since the last logout, that is, since the end of the user authenticated state (step S4). Specifically, CPU 108 determines whether a prescribed period of time has passed since the logout, based on the log information stored in HDD 102. It is noted that the time data of the last logout is stored in HDD 102 as log information based on the time information from clock 118. The prescribed period of time is any given period, may be 30 minutes, one hour, 24 hours, etc., and may be set freely according to the user's frequency of use, usage conditions, and the like.

If it is determined that a prescribed period of time has not passed since the last logout in step S4, authentication is performed in MFP 100 (step S5). Specifically, CPU 108 outputs to authentication controller 116 the authentication code entered in user authentication window 700.

Then, it is determined in authentication controller 116 whether the authentication is "OK" by matching with the authentication information stored in HDD 102 (step S6). The method of storing the authentication information in HDD 102 will be described later.

Specifically, authentication controller 116 determines whether the authentication code entered in user authentication window 700 matches the authentication code corresponding to the user managed by user information management portion 112. If they match, it is determined that the authentication is "OK," and if they do not match, it is determined that the authentication is failed.

If the authentication is "OK" in step S6, the authentication is successful (step S7). Specifically, authentication controller 116 outputs the authentication result to CPU 108.

Then, CPU 108 executes a login process (step S8).

Specifically, CPU 108 makes the function available to the user to allow a prescribed operation of MFP 100 using operation panel 10. In addition, CPU 108 instructs user information management portion 112 to read information such as the setting information or the address book of the corresponding user as stored in HDD 102. In doing so, CPU 108 stores the log information including the time data of the login time in HDD 102.

On the other hand, if it is determined that a prescribed period of time has passed since the last logout in step S4, authentication is performed by external authentication server 200 (step S9). Specifically, CPU 108 outputs to authentication controller 116 the authentication code entered in user authentication window 700.

Then, it is determined whether the authentication is "OK" or not in external authentication server 200 (step S10).

Specifically, authentication controller 116 transmits the authentication code to external authentication server 200 through network interface 110. It is determined in external authentication server 200 whether the authentication code identical to the authentication code transmitted from authentication controller 116 through network interface 110 is registered or not in external authentication server 200. If the identical authentication code is registered, it is determined that the authentication is "OK." The result is then output to authentication controller 116 of MFP 100.

If the authentication is "OK" in step S10, the authentication is successful (step S12). Specifically, if the authentication is "OK" based on the transmitted result from external authentication server 200, the authentication is successful. Specifically, authentication controller 116 outputs the authentication result to CPU 108.

Then, CPU 108 outputs the authentication information to user information management portion 112. User information management portion 112 stores in HDD 102 the authentication information including the user information transmitted from external authentication server 200 (step S13). It is noted that the authentication information also includes the entered authentication code.

It is noted that if the authentication is "OK," the user information transmitted from external authentication server 200 includes the determination result and information such as the user setting information or the address book for the user corresponding to the identical authentication code registered in external authentication server 200.

On the other hand, if the authentication is not "OK" in step S10, the authentication is failed (step S11). Specifically, authentication controller 116 outputs the authentication result to CPU 108, based on the transmitted result from external authentication server 200. If the authentication is failed, the user authentication process ends (END).

On the other hand, if the authentication is not "OK" in step S6, the authentication is failed, and authentication is performed by external authentication server 200 (step S9). Specifically, authentication controller 116 transmits the authentication code to external authentication server 200 through network interface 110. The subsequent process is similar to the one described above, and the detailed description will not be repeated.

For example, when a user logs in for the first time in a prescribed period after the other person logged out, in step S4, authentication should be performed in MFP 100, for a prescribed time has not passed. Here, since the user shifts to the login state for the first time, the authentication information has not yet registered in HDD 102 of MFP 100. In this case, therefore, the authentication process at external authentication server 200 in step S9 is performed. Then, if the authentication is successful in external authentication server 200, the similar process as described above is repeated.

Using FIG. 5, the logout and subsequent process in accordance with the first embodiment of the present invention will be described.

Figure 5:
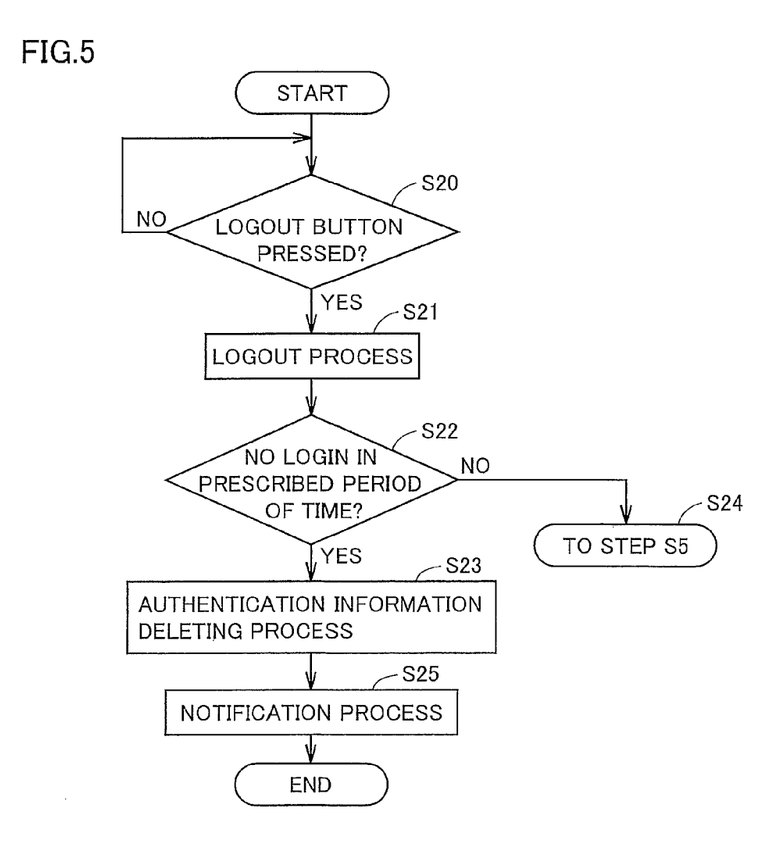
FIG. 5 is a flowchart illustrating a logout and a subsequent process in accordance with the first embodiment of the present invention.

Referring to FIG. 5, first, it is determined whether the logout button is pressed or not (step S20). Specifically, CPU 108 senses that login/logout button 28 of operation panel 10 is pressed.

If login/logout button 28 is pressed in the login state, that is, in the user authenticated state in step S20, CPU 108 executes a logout process (step S21). Specifically, CPU 108 terminates the user authentication process in response to the logout button of operation panel 10 being pressed. Accordingly, a prescribed operation on MFP 100 using operation panel 10 is disabled in MFP 100. In addition, CPU 108 stores log information including the time data of the logout time in HDD 102.

Then, it is determined whether a login process is performed or not in a prescribed period of time after the last logout (step S22).

If a login process is not performed in a prescribed period of time in step S22, an authentication information deleting process is executed (step S23).

Specifically, CPU 108 determines whether a login process is performed or not in a prescribed period of time, based on the time information from clock 118. If it is determined that a login process is not performed in a prescribed period of time, CPU 108 instructs user information management portion 112 so that user information management portion 112 deletes the authentication information stored in HDD 102.

Then, a notification process is executed for external authentication server 200 to indicate that the logout process is executed (step S25). Then the process ends (END). In response to this notification process, external authentication server 200 terminates the user authenticated state between external authentication server 200 and MFP 100.

On the other hand, if a login process is performed in a prescribed period of time in step S22, the process proceeds to step S5 in FIG. 3.

According to the technique in accordance with the first embodiment of the present invention, it is determined whether a prescribed period of time has passed or not since the last logout. If a prescribed period has not passed since the last logout, when a login operation instruction is executed, the user authentication process is executed in MFP 100. It is then determined whether the authentication code identical to the authentication code included in the authentication information managed by user information management portion 112 is input or not. Then, if it is determined that the authentication code is identical, it is determined that the authentication is "OK," allowing execution of a login process.

In other words, if a prescribed period of time has not passed since the last logout, when an operation instruction of a login process is executed, the authentication process can be executed in MFP 100 without executing the authentication process in external authentication server 200. Thus, the time required for the user authentication process, namely, the time it takes until the login process is performed, is shortened, thereby improving the user's convenience.

In addition, when a prescribed period of time has passed since the last logout, the process of deleting the authentication information is executed, so that the authentication information is not held in MFP 100 longer than a prescribed period of time, thereby enhancing security.

Meanwhile, the authentication code held in external authentication server 200 may be forced to be changed in terms of security.

For example, when the authentication code or the like used in the user authentication process is leaked to the outside, the administrator of external authentication server 200 may forcedly change it to another authentication code, for example. Supposing such a case, in order to increase security, the user authentication process may be executed again with external authentication server 200 after the login process is executed through the user authentication process in MPP 100. In this case, when the authentication is failed in the user authentication process with external authentication server 200, the logout state is forcedly set. Then, the authentication information is desirably deleted, if stored.

Alternatively, the user authentication process with external authentication server 200 may be repeatedly executed at prescribed time intervals after execution of the login process, in order to increase security. In this case, if the communication line has a problem in the user authentication process with external authentication server 200, the user authentication process may be executed in MFP 100.

The user authentication process may also be executed by accessing MFP 100 from external client PC 400. In this case, when the user authentication process is executed by accessing MFP 100 from external client PC 400, only the user authentication process at external authentication server 200 may be executed without executing the user authentication process in MFP 100.

In this example, user information management portion 112 may store and manage the user information of a single user in HDD 102, or may store and manage the user information of multiple users in HDD 102.

The whole processing in authentication controller 116 as described in this example may be executed in CPU 108. Furthermore, the whole processing in user information management portion 112 may be executed in CPU 108.

Second Embodiment

In the first embodiment, when the user authentication process in MFP 100 is executed, the use of all the functions is permitted as long as the authentication is successful. Here, a technique of limiting a part of functions when the user authentication process in MFP 100 is executed will be described.

Specifically, when it is determined that the authentication in MFP 100 is OK in step S6 in FIG. 3, the login process is executed as the authentication is successful. Here, when the authentication in MFP 100 is OK, a provisional login process is executed, even though the login process is executed as the authentication is successful.

The provisional login process refers to that the use of the functions in MFP 100 is limited when the provisional login process is executed, while a full login process is separately provided. For example, only a scan function by scanner 120 can be executed and a copy function by printer 122 and the like cannot be used.

Using FIG. 6, execution of a full login process in accordance with the second embodiment of the present invention will be described.

Figure 6:
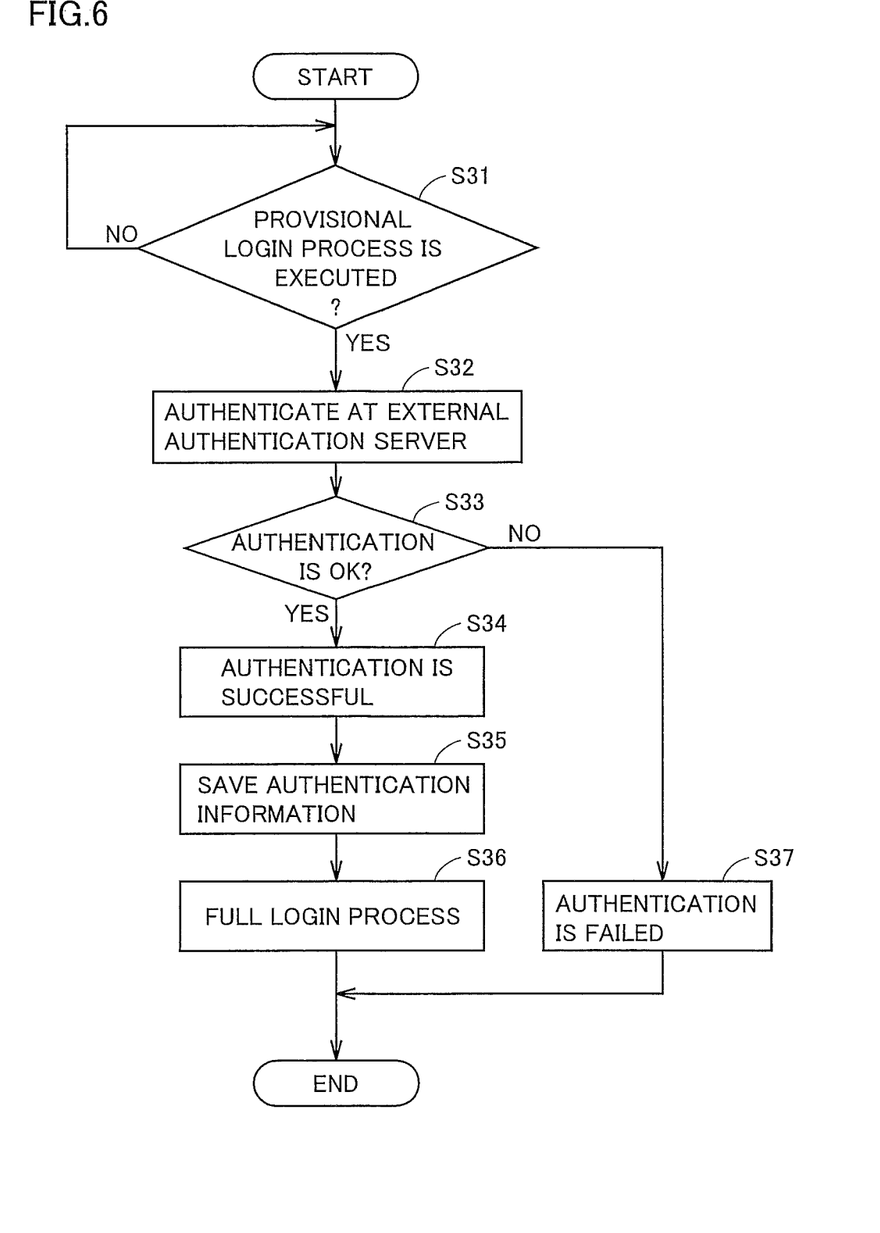
FIG. 6 is a flowchart illustrating that a full login process is executed in accordance with a second embodiment of the present invention.

Referring to FIG. 6, it is determined whether the provisional login process is executed or not (step S31).

If the provisional login process is executed, then the authentication process is executed at external authentication server 200 (step S32).

Then, it is determined whether the authentication is "OK" or not at external authentication server 200 (step S33).

Specifically, the input authentication code is transmitted to external authentication server 200 through network interface 110. Then, in external authentication server 200, it is determined whether or not the authentication code identical to the input authentication code is registered in external authentication server 200. If the identical authentication code is registered, it is determined that the authentication is "OK." The result is then output to authentication controller 116 of MFP 100.

If the authentication is "OK" in step S33, the authentication is successful (step S34). Specifically, if the authentication is "OK" based on the transmitted result from external authentication server 200, the authentication is successful.

The authentication information is then saved (step S35). The full login process is then executed (step S36). The execution of the full login process allows all the functions to be operated. Specifically, the execution of the full login process allows not only the scan function but also the copy function and the like in MFP 100 to be used.

According to this technique, when the provisional login process is executed, among a plurality of functions provided in MFP 100, a part of functions that present no problem are made available first, and when the full login process is executed, all the functions are made available, thereby ensuring security. It has been described in this example that the scan function is made available and the other functions are not made available, by way of example, when the provisional login process is executed. However, without being limited to the scan function, only the other part of functions that present no problem if made available may be made available. For example, only viewing of the address book or the like may be allowed.

Moreover, even when the authentication process using external authentication server 200 takes much time, a part of functions among a plurality of functions are made available through the provisional login process, thereby improving the user's convenience.

Third Embodiment

In the technique according to the foregoing first embodiment, whether the user authentication process in MFP 100 or the user authentication process at external authentication server 200 is determined based on whether a prescribed period of time has passed or not since the last logout. An additional condition may be provided.

Using FIG. 7, a user authentication process in accordance with a third embodiment of the present invention will be described.

Figure 7:
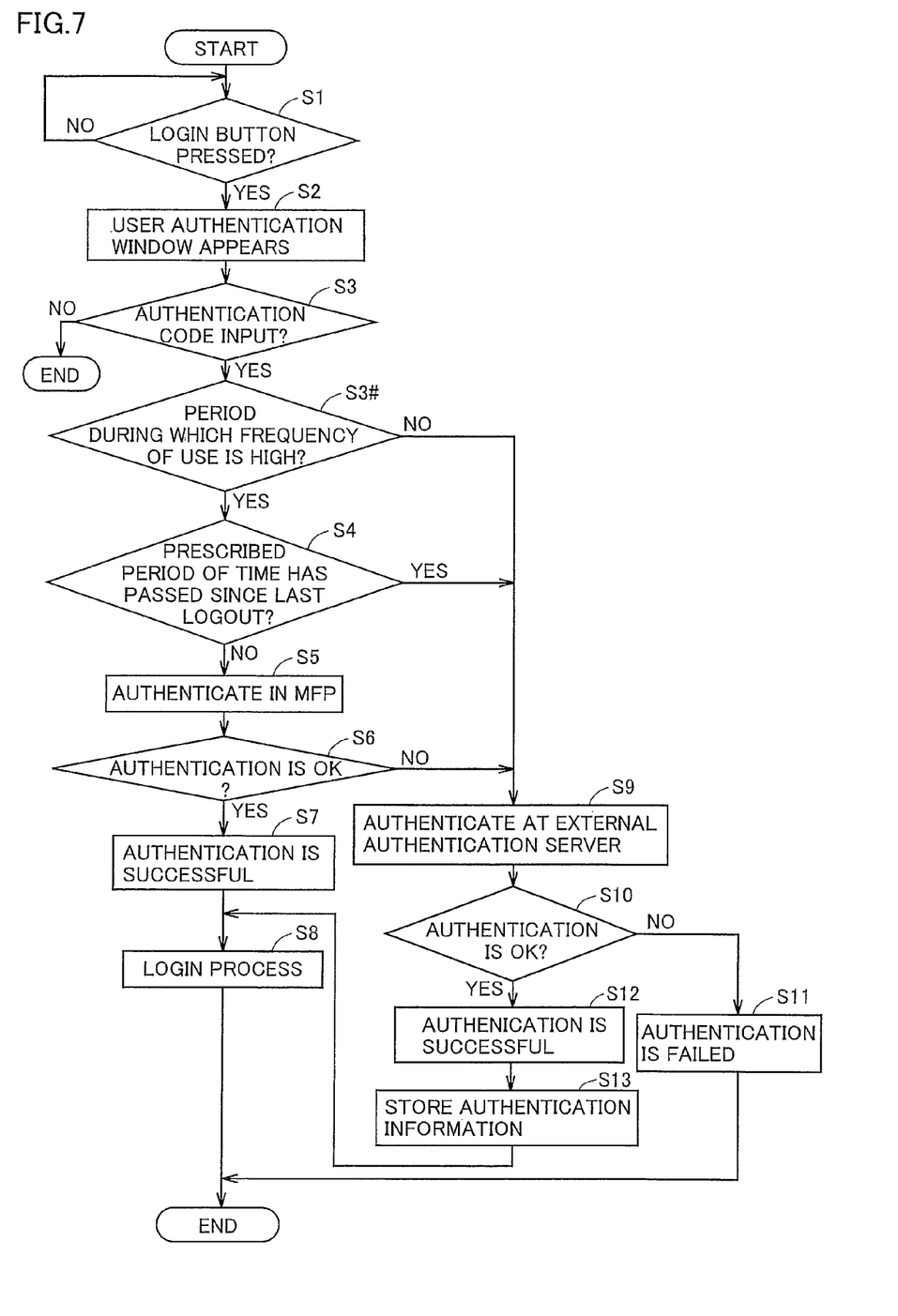
FIG. 7 is a flowchart illustrating a user authentication process in accordance with a third embodiment of the present invention.

Referring to FIG. 7, as compared with the flowchart illustrated in FIG. 3, step S3# is newly provided.

Specifically, after it is determined whether an authentication code is entered or not, if an authentication code is entered, it is then determined whether or not it is the period during which the frequency of use of MFP 100 is high (step S3#).

If it is the period during which the frequency of use of MFP 100 is high, the process proceeds to step S4. If it is the period during which the frequency of use of MFP 100 is not high, the process proceeds to step S9 to execute the user authentication process at external authentication server 200. Specifically, CPU 108 determines whether it is the period during which the frequency of the use is high or the period during which the frequency of the use is not high, based on the time information from clock 118, by way of example. This can be realized, for example, such that a prescribed period from morning to evening is set beforehand as the period during which the frequency of the use is high and a prescribed period during night after evening is set as the period during which the frequency of the use is not high, based on the time information. The prescribed period is only shown by way of example and may be set arbitrarily.

The other points are similar and the detailed description will not be repeated.

If it is the period during which the frequency of use of MFP 100 is high, based on the determination as to whether it is the period during which the frequency of use of MFP 100 is high or the period during which the frequency is not high, in step S3#, it is determined whether a prescribed period of time has passed or not since the last logout. If a prescribed period of time has not passed, the authentication is performed in MFP 100 (step S5).

On the other hand, in the other cases, that is, if it is the period during which the frequency of use of MFP 100 is low or if a prescribed period of time has passed although it is the period during which the frequency of the use is high, the user authentication process is executed at external authentication server 200.

According to this technique, in the case of the period during which the frequency of use of MFP 100 is high, the user authentication process is executed in MFP 100, with the emphasis on convenience. In the case of the period during which the frequency of use of MFP 100 is low, the user authentication process is executed at external authentication server 200, with the emphasis on security. This allows the user authentication process to be performed according to the frequency of use of MFP 100 by the user, thereby improving the user's convenience.

It is noted that the authentication apparatus in accordance with the present invention is not limited to MFP and may be a printer, a facsimile machine, or the like. For a controller controlling the authentication apparatus, a program may be provided which allows a computer to function to execute the control as described in the above-noted flows. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An authentication apparatus comprising:
    an input device including at least a body input device for accepting an input of an authentication code from a body side of the authentication apparatus;
    a memory for storing authentication information indicating a successful authentication;
    a controller for executing a user authentication process with at least one of an external authentication server connected via a network and the authentication apparatus to determine whether a user authenticated state should be set, wherein said controller detects whether the authentication code was input from said body input device within a prescribed period of time after a most recent designation of a termination of said user authenticated state, and wherein
    if it is detected that the authentication code was input from said body input device within the prescribed period, the controller executes the user authentication process with the authentication apparatus by comparing the input authentication code with the authentication information stored in said memory of said authentication apparatus and, if the input authentication code matches the authentication information stored in the memory of the authentication apparatus, permitting the user to log in, and
    if it is detected that the authentication code was not input from said body input device during said prescribed period of time, said controller compares the authentication code with information stored in the external authentication server and executes the user authentication process with said external authentication server based on a result of said comparison.

2. The authentication apparatus according to claim 1, wherein the authentication information stored in said memory of said authentication apparatus is deleted after a lapse of said prescribed period of time.

3. The authentication apparatus according to claim 1, wherein said memory of said authentication apparatus stores the input authentication code as a part of the authentication information if said user authenticated state is set.

4. The authentication apparatus according to claim 1, wherein said controller (i) repeatedly executes the user authentication process with said external authentication server at certain time intervals after said user authenticated state is set, to determine whether said user authenticated state should be set and (ii) executes, if it is determined that said user authenticated state should not be set by the user authentication process with said external authentication server at certain time intervals, said user authentication process based on comparison between the authentication information stored in said memory and the input authentication code.

5. The authentication apparatus according to claim 1, wherein, in said user authenticated state, said controller notifies said external authentication server of a termination command of said user authenticated state, if an authentication code corresponding to the authentication information stored in said memory and resulting into said user authenticated state being set was not input within said prescribed period of time.

6. The authentication apparatus according to claim 1, wherein if said user authenticated state is set by said user authentication process with the authentication apparatus, said controller executes said user authentication process again with said external authentication server.

7. The authentication apparatus according to claim 6, further comprising a function execution portion for allowing execution of a plurality of selectable prescribed functions, if said user authenticated state is set, wherein
    functions selectable from among said plurality of functions differ between when said user authenticated state is set by executing said user authentication process with said authentication apparatus and when said user authenticated state is set by executing said user authentication process again with said external authentication server.

8. The authentication apparatus according to claim 1, wherein said memory stores a plurality of input authentication codes that result into said user authenticated state being set.

9. The authentication apparatus according to claim 1, wherein said controller distinguishes between a first period during which user's frequency of use is high and a second period during which said user's frequency of use is low, in said first period during which user's frequency of use is high, if the authentication code was input from said body input device within the prescribed period, said controller sets said user authenticated state, based on comparison with the authentication information stored in said memory, and in said second period during which said user's frequency of use is low, if the authentication code was input from said body input device within the prescribed period, said controller sets said user authenticated state by executing the user authentication process with said external authentication server, by comparing the authentication code input by said body input device and the authentication information, which is registered and stored in said external authentication server.

10. The authentication apparatus according to claim 1, wherein said input device further includes a network input device configured to receive an external input of said authentication code through said network, wherein if said authentication code is input from said network input device during said prescribed period of time, said controller executes said user authentication process with said external authentication server.

11. An authentication system comprising:

an information processing apparatus for executing a prescribed function; and an external authentication server connected to said information processing apparatus via a network configured to execute a user authentication process for using said information processing apparatus, said external authentication server including a first memory for storing authentication information registered beforehand for executing said user authentication process, said information processing apparatus including:
an input device for accepting an input of an authentication code,
a controller for executing the user authentication process with at least one of said external authentication server and said information processing apparatus to determine whether a user authenticated state should be set, wherein said controller detects whether the authentication code was input from said input device within a prescribed period of time after a designation of a termination of said user authenticated state, and
a second memory for storing authentication information registered beforehand for executing said user authentication process, wherein
if the authentication code was input from said input device within the prescribed period of time, the controller sets said user authenticated state based on a comparison between the input authentication code and the authentication information stored in said second memory of said authentication apparatus, and
if the authentication code was not input from said input device within the prescribed period of time, the controller sets said user authenticated state based on a comparison between the input authentication code and authentication information stored in the first memory of the external authentication server.

12. An authentication method comprising the steps of:
accepting an input of an authentication code;
executing a user authentication process with at least one of an external authentication server connected to an information processing apparatus via a network and the information processing apparatus to determine whether a user authenticated state should be set;
detecting whether the authentication code was input within a prescribed period of time after a designation of a termination of said user authenticated state;
if the authentication code was input within the prescribed period of time, comparing authentication information stored in a memory of the information processing apparatus with the input authentication code;
if the authentication code was not input within the prescribed period of time, comparing the input authentication code with information stored in the external authentication server; and
setting the user authenticated state, based on a result of said comparison.

13. A non-transitory recording medium having an authentication program recorded thereon for causing a computer to execute processing including the steps of:
accepting an input of an authentication code;
executing a user authentication process with at least one of an external authentication server connected to an information processing apparatus via a network and the information processing apparatus to determine whether a user authenticated state should be set;
detecting whether the authentication code was input within a prescribed period of time after a designation of a termination of said user authenticated state;
if the authentication code was input within the prescribed period of time, comparing authentication information stored in a memory of the information processing apparatus with the input authentication code;
if the authentication code was not input within the prescribed period of time, comparing the input authentication code with information stored in the external authentication server; and
setting the user authenticated state, based on a result of said comparison.

* * * * *